(12) United States Patent
Jonnalagadda et al.

(10) Patent No.: US 12,517,758 B2
(45) Date of Patent: Jan. 6, 2026

(54) METHOD AND SYSTEM FOR MANAGING ELECTRONIC DESIGN AUTOMATION ON CLOUD

(71) Applicant: Tata Consultancy Services Limited, Mumbai (IN)

(72) Inventors: Guru Charan Prasad Jonnalagadda, Hyderabad (IN); Monika Bhuvanagiri, Hyderabad (IN); Swathi Chittajallu, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 766 days.

(21) Appl. No.: 17/731,420

(22) Filed: Apr. 28, 2022

(65) Prior Publication Data

US 2022/0365817 A1 Nov. 17, 2022

(30) Foreign Application Priority Data

Apr. 28, 2021 (IN) .............................. 202121019527

(51) Int. Cl.
*G06F 30/27* (2020.01)
*G06F 9/50* (2006.01)
*G06F 30/12* (2020.01)
(52) U.S. Cl.
CPC ................ *G06F 9/50* (2013.01); *G06F 30/12* (2020.01)
(58) Field of Classification Search
CPC .................................. G06F 9/50; G06F 30/12
(Continued)

(56) References Cited

U.S. PATENT DOCUMENTS 8,032,846 B1  10/2011  Balasubramanian et al.
11,134,013 B1 *  9/2021  Allen ..................... G06F 9/5072
(Continued)

OTHER PUBLICATIONS

Hosny, A., & Reda, S. (2021). Characterizing and optimizing EDA flows for the cloud. IEEE Transactions on Computer-Aided Design of Integrated Circuits and Systems, 41(9), 3040-3051. (Year: 2021).*
(Continued)

*Primary Examiner* — April Y Blair
*Assistant Examiner* — Justin Che-Chun Tong
(74) *Attorney, Agent, or Firm* — Finnegan, Henderson, Farabow, Garrett & Dunner, LLP (57) ABSTRACT

Existing techniques of managing Electronic Design Automation (EDA) on cloud are based on pre-defined policies which result in costly burst patterns and server farm tilt. Embodiments of present disclosure overcomes these drawbacks by a method and system for managing EDA on cloud which employ machine learning to predict optimal resource configurations for deploying EDA jobs and configuration circuit on cloud that holds resources required by the optimal resource configuration. Further, different Cloud Service Providers (CSPs) are evaluated to determine the least cost CSP which has the desired configuration circuit. Completion time of jobs, time required to burst the jobs on cloud, and a pre-defined desired cycle time are calculated as a sum to determine the corresponding wait time for each job. The jobs are retained in the queue for corresponding wait time before deploying them on the cloud. The jobs are deployed on the on-prem infrastructure if resources are freed up before the wait time.

6 Claims, 4 Drawing Sheets

(58) Field of Classification Search
USPC .................................................. 718/104, 102
See application file for complete search history.

(56) References Cited

U.S. PATENT DOCUMENTS

| | | | |
|---|---|---|---|
| 2020/0137581 A1* | 4/2020 | Gibson | G06F 30/398 |
| 2021/0112141 A1* | 4/2021 | Honnavalli | H04L 67/63 |
| 2024/0020144 A1* | 1/2024 | Zhao | G06F 9/45558 |

OTHER PUBLICATIONS

Hosny et al., "Characterizing and Optimizing EDA Flows for the Cloud," (2021).

* cited by examiner

METHOD AND SYSTEM FOR MANAGING ELECTRONIC DESIGN AUTOMATION ON CLOUD

PRIORITY CLAIM

This U.S. patent application claims priority under 35 U.S.C. § 119 to: Indian Patent Application number 202121019527, filed on Apr. 28, 2021. The entire contents of the aforementioned application are incorporated herein by reference.

TECHNICAL FIELD

The disclosure herein generally relates to the field of cloud computing, and, more particularly, to method and system for managing electronic design automation on cloud.

BACKGROUND

Electronic circuits, such as integrated circuits (IC) and printed circuit boards (PCBs), are used in every facet of modern society from automobiles to microwaves to personal computers.

Electronic design automation (EDA) supports the design and verification of electronic circuits through design simulations. Conventionally, researchers submit their design simulations as jobs on to a High-Performance Compute (HPC) infrastructure, alternately referred as server farm, which executes the design simulations and provides results to the researchers. A medium size enterprise which designs electronic circuits utilizes a server farm with approximately 35000 cores. This server farm is capable of hosting around 500 million jobs in a year and clock 170 million CPU hours. However, they are not sufficient to handle the volume of design simulation jobs that are submitted by the researchers in a year and therefore the design simulations are significantly delayed due to the unavailability of cores in the server farm to run the simulations. It is challenging to increase/decrease the size of the server farm according to requirements of design simulation jobs at a specific instance of time. Hence, the enterprises are considering the option of using cloud to meet these demands.

However, the enterprises face several challenges in leveraging cloud. Firstly, there are many Cloud Service Providers (CSPs), for example, Amazon web services, Microsoft Azure etc., who provide a range of options of hardware resources with different computing capabilities. Therefore, it is challenging to identify the best fit CSP that meets the requirements of EDA jobs in the enterprise. The second challenge is to optimize HPC resource utilization to increase the job throughput. The third challenge is to identify jobs which qualify to be run on cloud and determine a reasonable wait time before the qualified jobs are considered for cloud bursting. Finally, it is challenging to predict the cost/resources required to seamlessly perform the jobs.

Existing techniques of dimensioning resources, scheduling the burst on cloud, and optimizing the server farm on premises of the enterprise are based on pre-defined policies which govern the queues into which the jobs are pooled before the resources get freed up. Since the existing techniques are based on static priorities, they may result in inefficiencies that could result in costly burst patterns and server farm tilt. Costly burst patterns refer to bursting the jobs on to the cloud without precisely estimating that on-prem server farm resources will not be freed up in desired time. Hence, they result in disproportionate resource awarding. Server farm tilt also leads to disproportionate resource awarding due to overfitting or underfitting of resources. For example, if 8 cores are awarded for a job that requires only 2 cores, it results in over fitting. Similarly, if 3 cores are awarded for a job that needs 6 cores, it results in under fitting. Hence, it is important to address these inefficiencies so that all the resources available on-prem HPC infrastructure are used optimally, and cloud resources are leveraged as per requirements.

SUMMARY

Embodiments of the present disclosure present technological improvements as solutions to one or more of the above-mentioned technical problems recognized by the inventors in conventional systems. For example, in one embodiment, a method for managing Electronic Design Automation (EDA) on cloud is provided. The method includes receiving data related to (i) one or more EDA jobs, (ii) historic execution of the one or more EDA jobs and (iii) a cloud infrastructure. Further, an optimal resource configuration required to accomplish the one or more EDA jobs is predicted based on the received data using a first Machine Learning (ML) model. Further, the method includes predicting a partition on a cloud and a configuration circuit within the predicted partition that holds resources required by the optimal resource configuration using a second ML model. The configuration circuit comprises compute, network, storage, and technology layer over which each of the one or more EDA jobs are scheduled. The method further comprises evaluating cost of deploying the one or more EDA jobs over the configuration circuit on a plurality of Cloud Service Providers (CSPs) to determine a CSP among the plurality of CSPs that incurs lowest cost and determining completion time of each of the one or more EDA jobs based on historic completion time of the one or more EDA jobs deployed over the configuration circuit on the determined CSP. Furthermore, time required to burst each of the one or more EDA jobs on the cloud is determined based on (i) interconnect network performance between an on-prem infrastructure at an enterprise and the determined CSP and (ii) time required to spin up the configuration circuit on the cloud. Further, a wait time corresponding to each of the one or more EDA jobs is calculated as a sum of completion time of the EDA job, time required to burst the EDA job on the cloud and a pre-defined desired cycle time and each of the one or more EDA jobs are deployed over the configuration circuit on the determined CSP after retaining each of the one or more EDA jobs in a queue for the corresponding calculated wait time.

The method further comprises deploying the one or more EDA jobs over the on-prem infrastructure if resources in the on-prem infrastructure are freed up before the corresponding calculated wait time. In another embodiment, the method further comprises observing execution of the one or more EDA jobs on the cloud and the on-prem infrastructure to calculate a plurality of parameters comprising queue throughput, server farm tilt index, queue efficiency index, configuration circuit hit rate, configuration circuit efficiency index, and landing zone efficiency. Further, the first ML model and the second ML model are tuned based on the plurality of parameters to improve prediction of the first ML model and the second ML model.

In another aspect, a system for managing Electronic Design Automation (EDA) on cloud is provided. The system includes a memory storing instructions; one or more communication interfaces; and one or more hardware processors coupled to the memory via the one or more communication interfaces, wherein the one or more hardware processors are configured by the instructions to: receive data related to (i) one or more EDA jobs, (ii) historic execution of the one or more EDA jobs and (iii) a cloud infrastructure. Further, an optimal resource configuration required to accomplish the one or more EDA jobs is predicted based on the received data using a first Machine Learning (ML) model. Further, the one or more hardware processors are configured to predict a partition on a cloud and a configuration circuit within the predicted partition that holds resources required by the optimal resource configuration using a second ML model. The configuration circuit comprises compute, network, storage, and technology layer over which each of the one or more EDA jobs are scheduled. The one or more hardware processors are further configured to evaluate cost of deploying the one or more EDA jobs over the configuration circuit on a plurality of Cloud Service Providers (CSPs) to determine a CSP among the plurality of CSPs that incurs lowest cost and determining completion time of each of the one or more EDA jobs based on historic completion time of the one or more EDA jobs deployed over the configuration circuit on the determined CSP. Furthermore, time required to burst each of the one or more EDA jobs on the cloud is determined based on (i) interconnect network performance between an on-prem infrastructure at an enterprise and the determined CSP and (ii) time required to spin up the configuration circuit on the cloud. Further, a wait time corresponding to each of the one or more EDA jobs is calculated as a sum of completion time of the EDA job, time required to burst the EDA job on the cloud and a pre-defined desired cycle time and each of the one or more EDA jobs are deployed over the configuration circuit on the determined CSP after retaining each of the one or more EDA jobs in a queue for the corresponding calculated wait time.

The one or more hardware processors are further configured to deploy the one or more EDA jobs over the on-prem infrastructure if resources in the on-prem infrastructure are freed up before the corresponding calculated wait time. In another embodiment, the one or more hardware processors are further configured to observe execution of the one or more EDA jobs on the cloud and the on-prem infrastructure to calculate a plurality of parameters comprising queue throughput, server farm tilt index, queue efficiency index, configuration circuit hit rate, configuration circuit efficiency index, and landing zone efficiency. Further, the first ML model and the second ML model are tuned based on the plurality of parameters to improve prediction of the first ML model and the second ML model.

In yet another aspect, there are provided one or more non-transitory machine-readable information storage mediums comprising one or more instructions which when executed by one or more hardware processors cause a method for managing Electronic Design Automation (EDA) on cloud. The method includes receiving data related to (i) one or more EDA jobs, (ii) historic execution of the one or more EDA jobs and (iii) a cloud infrastructure. Further, an optimal resource configuration required to accomplish the one or more EDA jobs is predicted based on the received data using a first Machine Learning (ML) model. Further, the method includes predicting a partition on a cloud and a configuration circuit within the predicted partition that holds resources required by the optimal resource configuration using a second ML model. The configuration circuit comprises compute, network, storage, and technology layer over which each of the one or more EDA jobs are scheduled. The method further comprises evaluating cost of deploying the one or more EDA jobs over the configuration circuit on a plurality of Cloud Service Providers (CSPs) to determine a CSP among the plurality of CSPs that incurs lowest cost and determining completion time of each of the one or more EDA jobs based on historic completion time of the one or more EDA jobs deployed over the configuration circuit on the determined CSP. Furthermore, time required to burst each of the one or more EDA jobs on the cloud is determined based on (i) interconnect network performance between an on-prem infrastructure at an enterprise and the determined CSP and (ii) time required to spin up the configuration circuit on the cloud. Further, a wait time corresponding to each of the one or more EDA jobs is calculated as a sum of completion time of the EDA job, time required to burst the EDA job on the cloud and a pre-defined desired cycle time and each of the one or more EDA jobs are deployed over the configuration circuit on the determined CSP after retaining each of the one or more EDA jobs in a queue for the corresponding calculated wait time.

The method further comprises deploying the one or more EDA jobs over the on-prem infrastructure if resources in the on-prem infrastructure are freed up before the corresponding calculated wait time. In another embodiment, the method further comprises observing execution of the one or more EDA jobs on the cloud and the on-prem infrastructure to calculate a plurality of parameters comprising queue throughput, server farm tilt index, queue efficiency index, configuration circuit hit rate, configuration circuit efficiency index, and landing zone efficiency. Further, the first ML model and the second ML model are tuned based on the plurality of parameters to improve prediction of the first ML model and the second ML model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Electronic Design Automation (EDA) involves creation of design simulations and submitting them as jobs (referred as EDA jobs herein) onto an infrastructure hosting a plurality of nodes/resources to run the jobs. Typically, the resources are present in a High-Performance Compute (HPC) infrastructure on premises of the enterprise. The resources take some amount of time to execute each of the submitted jobs. Meanwhile, if new jobs are submitted, then, they must wait in a queue until the resources are freed up. To accelerate execution of the jobs, the enterprise may consider bursting the jobs onto cloud resources by considering several factors such as priority of the jobs, cost of execution of the jobs on the cloud, can the job wait until resources on HPC infrastructure are available etc. Existing techniques for deploying EDA on cloud are based on static policies and result in inefficiencies such as server farm tilt.

Embodiments of present disclosure address these technical challenges by a method and system for managing EDA on cloud which employs machine learning to predict (i) optimal resource configurations for deploying EDA jobs and (ii) configuration circuit on cloud that holds resources required by the optimal resource configuration. Further, different Cloud Service Providers (CSPs) are evaluated to determine the least cost CSP which has the desired configuration circuit. Completion time of jobs and time required to burst the jobs on cloud are calculated based on which a wait time is determined. The jobs are retained in the queue for corresponding wait time before deploying them on the cloud. The jobs are deployed on the on-prem infrastructure if resources are freed up before the wait time. Thus, the method disclosed herein enables automated selection of jobs to be deployed on cloud or on-prem infrastructure systematically and it has been experimentally determined that the method disclosed herein accelerates process of selection of jobs by 70%. The prediction of optimal resource configuration and deployment of jobs on the predicted configuration by the disclosed method and system overcomes the inefficiencies such as costly burst patterns and server farm tilt.

Figure 1:
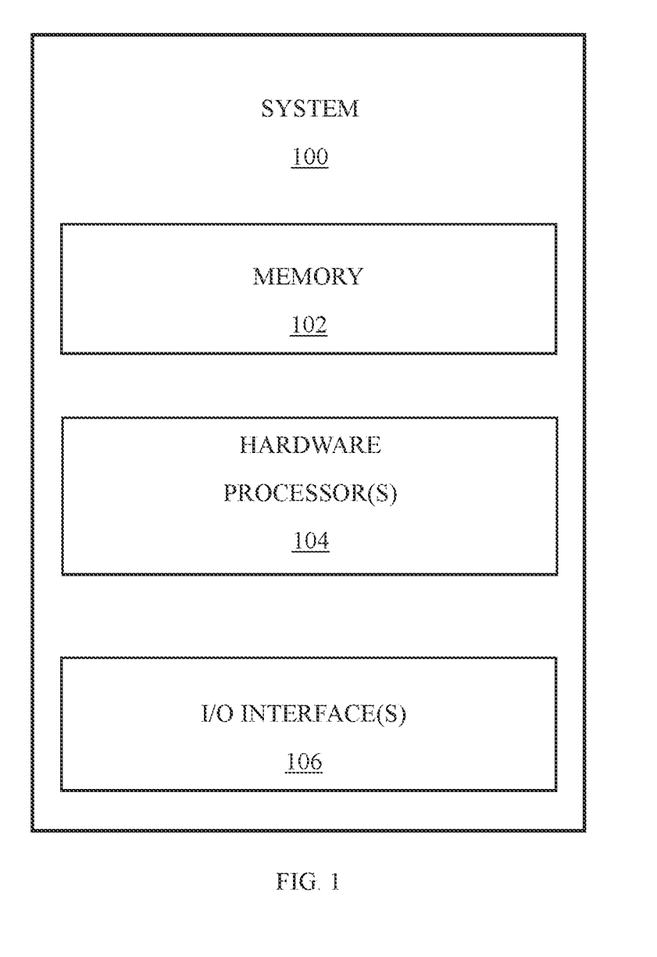
FIG. 1 illustrates an exemplary system for managing Electronic Design Automation (EDA) on cloud, according to some embodiments of the present disclosure.
Figure 2:
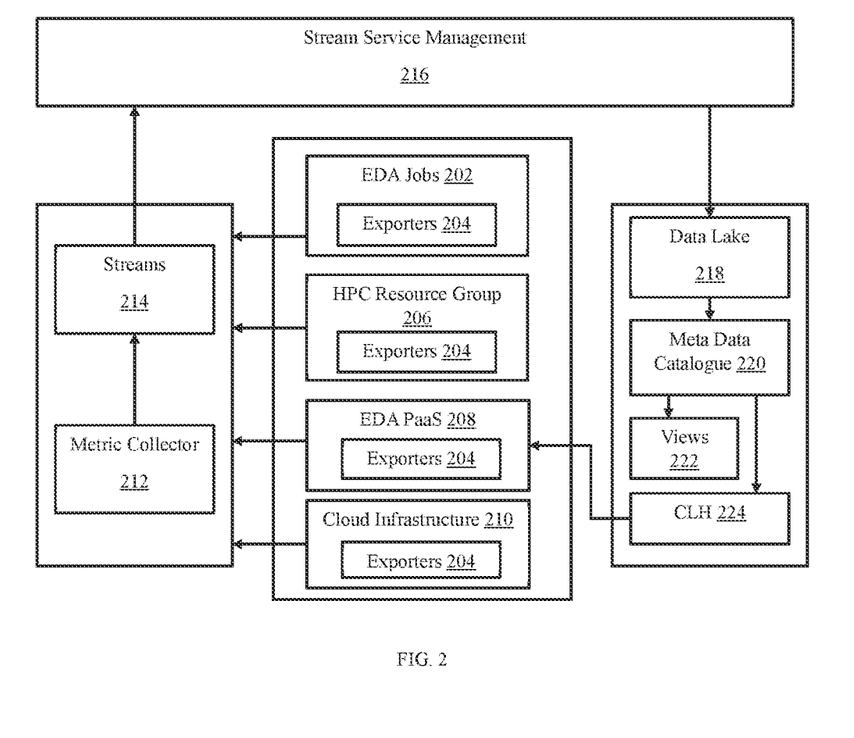
FIG. 2 illustrates an architecture of a base platform executed on the system of FIG. 1 for implementing EDA on cloud, according to some embodiments of the present disclosure.
Figure 3A:
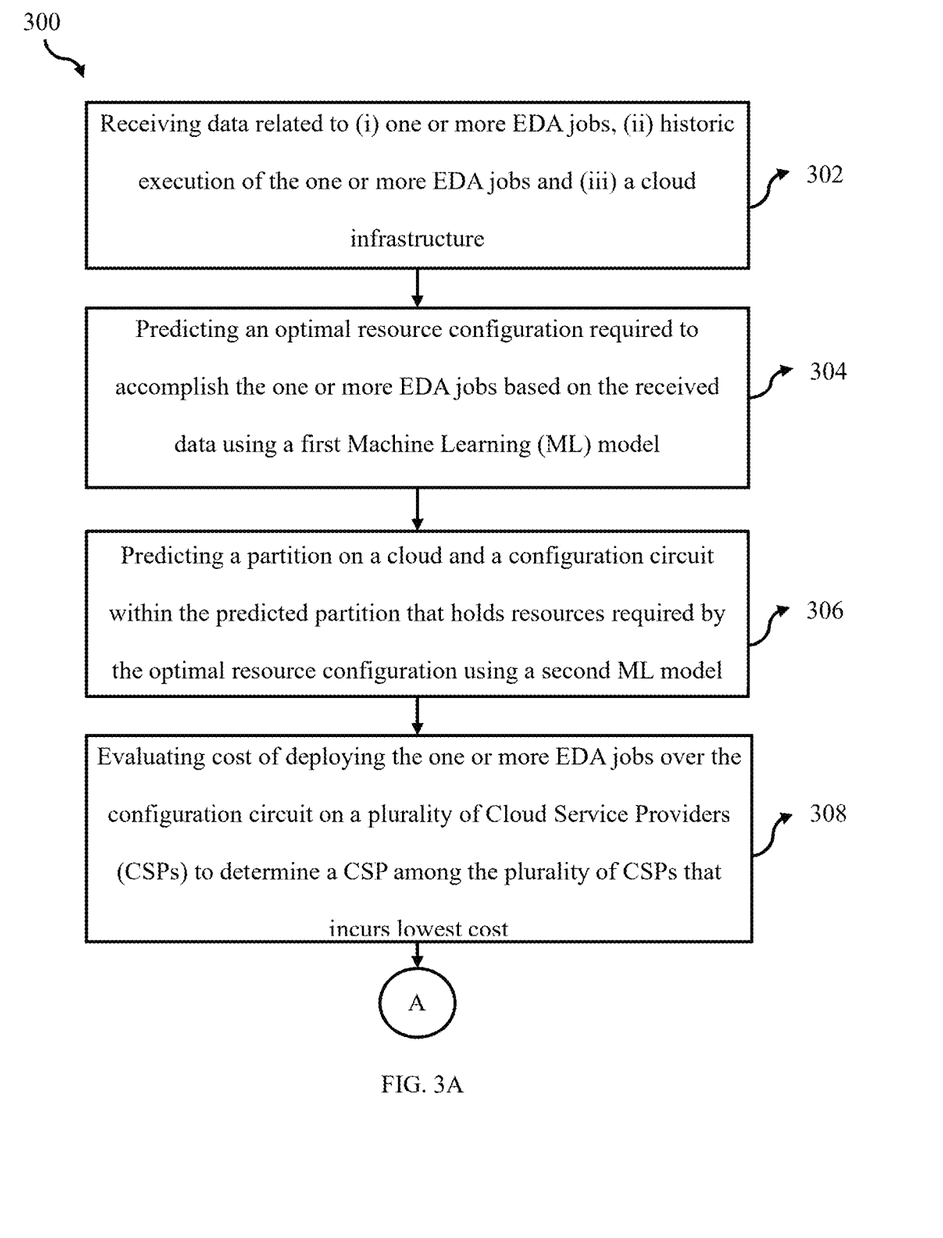
FIGS. 3A and 3B, collectively referred to as FIG. 3, is a flowchart illustrating a method for managing EDA on cloud, according to some embodiments of the present disclosure.
Figure 3B:
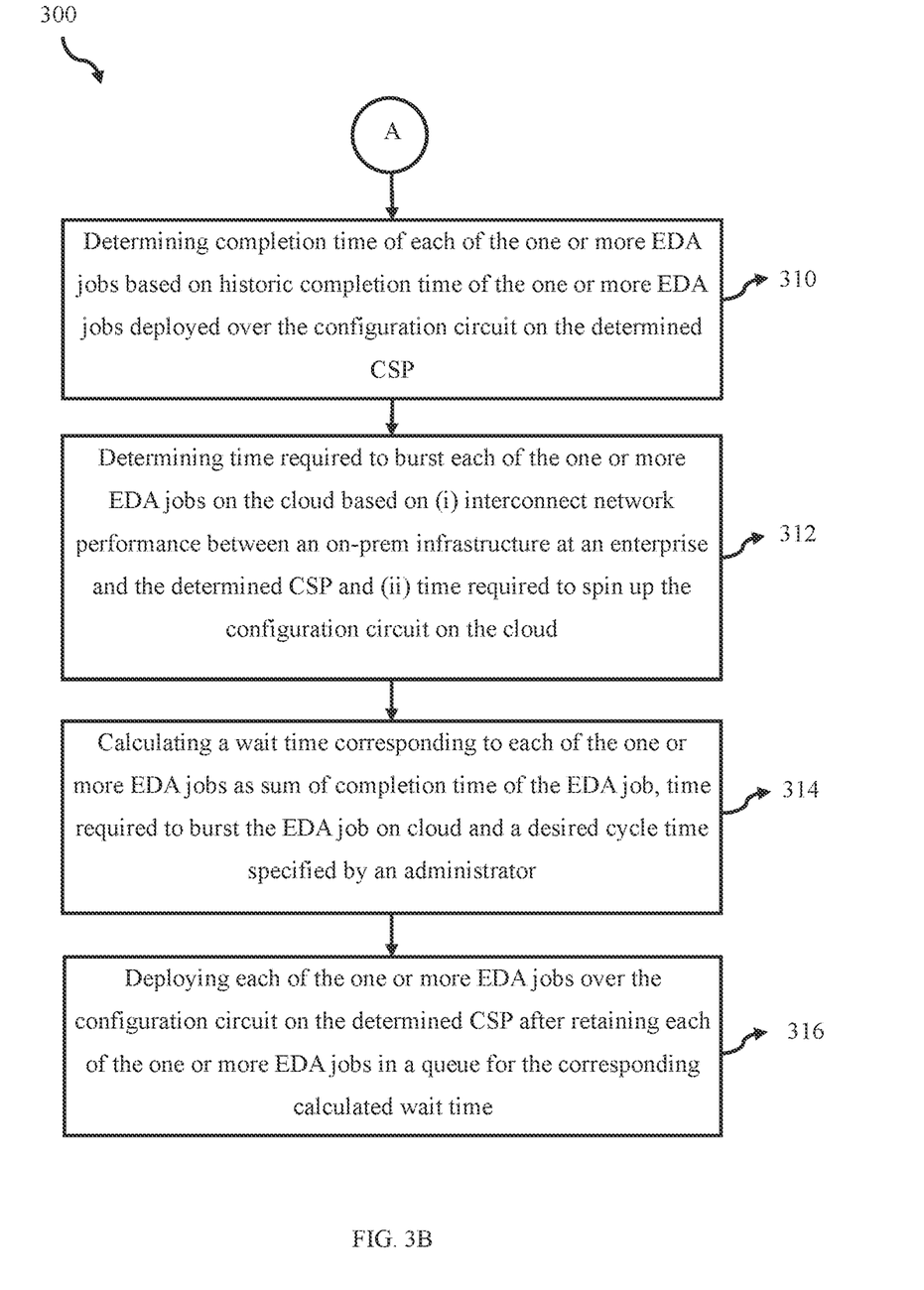

Referring now to the drawings, and more particularly to FIG. 1 through 3, where similar reference characters denote corresponding features consistently throughout the figures, there are shown preferred embodiments and these embodiments are described in the context of the following exemplary system and/or method.

FIG. 1 illustrates an exemplary block diagram of a system implementing a method for managing Electronic Design Automation (EDA) on cloud. In an embodiment, the system 100 includes one or more processors 104, communication interface device(s) 106 or Input/Output (I/O) interface(s) 106 or user interface 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. In an embodiment, the I/O interface device(s) 106 facilitate users to configure design simulations and view the simulation results. The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 stores the instructions which are then executed on the one or more hardware processors 104. Functions of the components of system 100 are explained in conjunction with base platform depicted in FIG. 2, and flowchart illustrated in FIG. 3.

FIG. 2 illustrates an architecture of a base platform executed on the system of FIG. 1 for implementing EDA on cloud, according to some embodiments of the present disclosure. Functions of a plurality of components of the base platform are explained in conjunction with FIG. 3, where FIGS. 3A and 3B, collectively referred to as FIG. 3, is a flowchart illustrating a method for managing the EDA on cloud, according to some embodiments of the present disclosure. The base platform may be implemented on premises of the enterprise or on the cloud as per requirements of the enterprise. The plurality of components of the base platform are executed, via one or more hardware processors 104, according to the instructions stored in the memory 102. The plurality of components include EDA Jobs 202, exporters 204, High Performance Computing (HPC) resource group 206, Electronic Design Automation (EDA) Platform as a Service (PaaS) 208, cloud infrastructure 210, metric collector 212, streams 214, stream service management 216, data lake 218, metadata catalogue 220, views 222 and Continuous Learning Hub (CLH) 224. In an embodiment, one or more EDA jobs 202 are submitted to the base platform by one or more researchers via I/O interface(s) 106. Further, the exporters 204 extract data related to the EDA jobs 202, the HPC resource group 206, EDA PaaS 208, and the cloud infrastructure 210 using techniques well understood by person skilled in the art. The extracted data essentially captures the capabilities of the HPC resource group and appetite of the one or more EDA jobs. In another embodiment, data related to (i) the one or more EDA jobs (202), (ii) historic execution of the one or more EDA jobs and (iii) a cloud infrastructure (210) are received at step 302 of the method 300 by the one or more hardware processors 104 via the I/O interface(s) 106. For example, the data comprises type and technology of the one or more EDA jobs, number of gates in design of the one or more EDA jobs, hardware processors allocated to the one or more EDA jobs, number of nodes in each of the hardware processors, Random Access Memory (RAM) allocated to the one or more EDA jobs, hard disk allocated to the one or more EDA jobs, number of Non-Uniform Memory Access (NUMA) regions on node, NUMA affinity, hyper threading status, running frequency of the hardware processors, maximum frequency of the hardware processors, L2/L3 Cache, configuration of the hardware processors, disk I/O, number of parallel threads of the one or more EDA jobs, NUMA latency, run time of the one or more EDA jobs, average percentage utilization per core of the hardware processors, peak percentage utilization per core, average RAM utilization, peak RAM utilization, disk utilization, average wait time of EDA jobs in the queue (in hours), average number of EDA jobs in queue per day, and node up time. The data further comprises geo presence index of the cloud infrastructure, EDA job diversity factor, hardware refresh cycle of the cloud infrastructure, protected license investments of the cloud infrastructure, security Key Performance Indicators (KPIs) of the cloud infrastructure, software lock-in index of EDA tool, and design experience level. Further, the data also includes number of reruns of the one or more EDA jobs, cloud infrastructure uptime, throughput of the one or more EDA jobs, flow rate of the one or more EDA jobs, and rate of consumption of EDA tool licenses.

Further, the metric collector 212 collects the extracted data and transfers it to the stream service management 216 via streams 214. The stream service management block 216 pre-processes the extracted metrics and stores them in the data lake 218. Further, the metadata catalogue 220 generates metadata by extracting unique features and correlations in the data stored in the data lake 218. The metadata is used to train a first Machine Learning (ML) model and a second ML model available in the CLH 224. In an embodiment, the first ML model is a random forest regression model, and the second ML model is a random forest classification model. Any other ML models known in the art can be used in alternate embodiments. At step 304 of the method 300, the first ML model predicts an optimal resource configuration required to accomplish the one or more EDA jobs based on the received data. Further, at step 306 of the method 300, a partition on a cloud and a configuration circuit within the predicted partition that holds resources required by the optimal resource configuration is predicted using the second ML model. The configuration circuit comprises compute, network, storage, and technology layer over which each of the one or more EDA jobs are scheduled. Once the configuration circuit is determined, at step 308 of the method 300, cost of deploying the one or more EDA jobs over the configuration circuit on a plurality of Cloud Service Providers (CSPs) are evaluated to determine a CSP among the plurality of CSPs that incurs lowest cost. Upon determining least cost CSP, at step 310 of the method 300, completion time of each of the one or more EDA jobs is determined based on historic completion time of the one or more EDA jobs deployed over the configuration circuit on the determined CSP. Further, at step 312 of the method 300, time required to burst each of the one or more EDA jobs on the cloud is determined based on (i) interconnect network performance between an on-prem infrastructure at an enterprise and the determined CSP and (ii) time required to spin up the configuration circuit on the cloud. Upon determining the time required to burst, at step 314 of the method 300, a wait time corresponding to each of the one or more EDA jobs is calculated as a sum of completion time of the EDA job, time required to burst the EDA job on the cloud and a pre-defined desired cycle time. In an embodiment, the desired cycle time is a weight (fractional value between 0.2-2) assigned by an administrator based on priority of the EDA job-2 for the least priority and 0.2 for the highest priority. In alternate embodiments, different methods can be used to determine desired cycle time as understood by persons skilled in the art. Once the wait time is determined, at step 316 of the method 300, each of the one or more EDA jobs are deployed over the configuration circuit on the determined CSP by the EDA PaaS 208 after retaining each of the one or more EDA jobs in a queue for the corresponding calculated wait time. In case resources in the on-prem infrastructure are freed up before the corresponding calculated wait time, the one or more EDA jobs are deployed over the on-prem infrastructure (HPC resource group 206). The base platform operates continuously as and when researchers submit EDA jobs. At any intermediary stage, reports may be generated by the views 222 and displayed to the researchers (or any other users) via the I/O interface(s) 106.

In an embodiment, the CLH observes execution of the one or more EDA jobs on the cloud and the on-prem infrastructure to calculate a plurality of parameters comprising queue throughput, server farm tilt index, queue efficiency index, configuration circuit hit rate, configuration circuit efficiency index, and landing zone efficiency. As understood by a person skilled in the art, the queue throughput refers to number of EDA jobs scheduled by the queue per day. The server farm tilt index measures percentage utilization of the server farm. The queue efficiency index is defined as the ability of the queue to keep the core utilization at peak at all times. The configuration circuit hit rate measures number of times a particular configuration circuit was used by the scheduler to host the EDA jobs. The configuration circuit efficiency index measures how efficiently the configuration circuit utilizes the resources to run the EDA jobs using methods understood by a person skilled in the art. Similarly, the landing zone efficiency determines efficiency of the cloud region in providing the desired resources to the EDA job. Once the plurality of parameters are calculated, the CLH tunes or retrains the first ML model and the second ML model based on the plurality of parameters to improve prediction of the first ML model and the second ML model. In another embodiment, the CLH additionally identifies bias in the metadata generated by the metadata catalogue 220 by one or more data analysis techniques such as observing the distribution of data etc. Bias in the metadata indicates that the metadata is significantly different from the data used to previously train the models. Hence, the models are retrained whenever there is a bias in the metadata.

The embodiments of present disclosure herein addresses unresolved problem of bursting EDA jobs on cloud without resulting in inefficiencies such as costly burst patterns and server farm tilt. The present disclosure calculates wait time for the EDA jobs, costs involved in performing the EDA jobs on cloud options offered by different cloud service providers etc. to determine when the EDA jobs should be scheduled, what resources need to be allocated to the EDA jobs and where the jobs must be scheduled. This process is automatic, satisfies the time constraints of the EDA jobs and results in least expenditure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for managing Electronic Design Automation (EDA) on cloud, the method comprising:

submitting one or more EDA jobs to a base platform by one or more researchers via I/O interface(s), wherein the base platform is implemented on premises of an enterprise or on the cloud as per requirements of the enterprise, wherein a plurality of components of the base platform are executed, via one or more hardware processors and wherein the plurality of components of the base platform comprises the one or more EDA Jobs, exporters, High Performance Computing (HPC) resource group, Electronic Design Automation (EDA) Platform as a Service (PaaS), cloud infrastructure, metric collector, streams, stream service management, data lake, metadata catalogue, views and Continuous Learning Hub (CLH);

extracting data related to the one or more EDA jobs, the HPC resource group, the EDA PaaS, and the cloud infrastructure by the exporters, wherein the extracted data captures the capabilities of the HPC resource group of the one or more EDA jobs;

receiving, by the one or more hardware processors, data related to (i) the one or more EDA jobs, (ii) historic execution of the one or more EDA jobs and (iii) the cloud infrastructure, wherein the received data comprises Random Access Memory (RAM) allocated to the one or more EDA jobs, hard disk allocated to the one or more EDA jobs, average RAM utilization, peak RAM utilization, disk utilization, and number of reruns of the one or more EDA jobs;

transferring, by the one or more hardware processors, the received data to stream services management for pre-processing a plurality of metrics extracted from the received data, wherein the plurality of metrics are stored in the data lake;

training, by the one or more hardware processors, a first Machine Learning (ML) model and a second ML model using metadata generated by extracting features and correlations in the received data stored in the data lake;

predicting, by the one or more hardware processors, an optimal resource configuration required to accomplish the one or more EDA jobs based on the received data using the first Machine Learning (ML) model;

predicting, by the one or more hardware processors, a partition on the cloud and a configuration circuit within the predicted partition that holds resources required by the optimal resource configuration using the second ML model, wherein the configuration circuit comprises compute, network, storage, and technology layer over which each of the one or more EDA jobs are scheduled;

evaluating, by the one or more hardware processors, cost of deploying the one or more EDA jobs over the configuration circuit on a plurality of Cloud Service Providers (CSPs) to determine a CSP among the plurality of CSPs that incurs lowest cost;

determining, by the one or more hardware processors, completion time of each of the one or more EDA jobs based on a historic completion time of the one or more EDA jobs deployed over the configuration circuit on the determined CSP;

determining, by the one or more hardware processors, time required to burst each of the one or more EDA jobs on the cloud based on (i) interconnect network performance between an on-prem infrastructure at an enterprise and the determined CSP and (ii) time required to spin up the configuration circuit on the cloud;

calculating, by the one or more hardware processors, a wait time corresponding to each of the one or more EDA jobs as a sum of completion time of the EDA job, time required to burst the EDA job on the cloud and a pre-defined desired cycle time, wherein time constraints of the one or more EDA jobs are automatically satisfied;

deploying, by the one or more hardware processors, each of the one or more EDA jobs over the configuration circuit on the determined CSP after retaining each of the one or more EDA jobs in a queue for the corresponding calculated wait time, wherein the one or more EDA jobs are deployed over the on-prem infrastructure when resources in the on-prem infrastructure are freed up before the corresponding calculated wait time;

generating reports by the views at an intermediary stage of operation of the base platform and displaying to the one or more researchers via the I/O interface(s);

observing execution of the one or more EDA jobs on the cloud and the on-prem infrastructure to calculate a plurality of parameters comprising queue throughput, server farm tilt index, queue efficiency index, configuration circuit hit rate, configuration circuit efficiency index, and landing zone efficiency, wherein the queue throughput refers to number of EDA jobs scheduled by the queue per day, wherein the server farm tilt index measures percentage utilization of a server farm, wherein the queue efficiency index is ability of the queue to keep the core utilization at peak at all times, wherein the configuration circuit hit rate measures number of times a particular configuration circuit was used by a scheduler to host the one or more EDA jobs, and wherein the configuration circuit efficiency index measures efficient utilization of the resources by the configuration circuit to run the one or more EDA jobs; and retraining the first ML model and the second ML model based on the plurality of parameters and bias in the metadata, wherein the bias in the metadata is identified by observing distribution of the received data and the bias in the metadata indicates that the metadata is different from the data used to train the first ML model and the second ML model to improve prediction of the first ML model and the second ML model.

2. The method of claim 1, wherein the received data comprises type and technology of the one or more EDA jobs, number of gates in design of the one or more EDA jobs, hardware processors allocated to the one or more EDA jobs, number of nodes in each of the hardware processors, number of Non-Uniform Memory Access (NUMA) regions on node, NUMA affinity, hyper threading status, running frequency of the hardware processors, maximum frequency of the hardware processors, L2/L3 Cache, configuration of the hardware processors, disk I/O, number of parallel threads of the one or more EDA jobs, NUMA latency, run time of the one or more EDA jobs, average percentage utilization per core of the hardware processors, peak percentage utilization per core, average wait time of EDA jobs in the queue (in hours), average number of EDA jobs in queue per day, node up time, geo presence index of the cloud infrastructure, EDA job diversity factor, hardware refresh cycle of the cloud infrastructure, protected license investments of the cloud infrastructure, security Key Performance Indicators (KPIs) of the cloud infrastructure, software lock-in index of EDA tool, design experience level, cloud infrastructure uptime, throughput of the one or more EDA jobs, flow rate of the one or more EDA jobs, and rate of consumption of EDA tool licenses.

3. A system comprising:
a memory storing instructions;
one or more communication interfaces; and
one or more hardware processors coupled to the memory via the one or more communication interfaces, wherein the one or more hardware processors are configured by the instructions to:
submit one or more EDA jobs to a base platform by one or more researchers via I/O interface(s), wherein the base platform is implemented on premises of an enterprise or on cloud as per requirements of the enterprise and wherein a plurality of components of the base platform are executed, via the one or more hardware processors and wherein the plurality of components of the base platform comprises the one or more EDA Jobs, exporters, High Performance Computing (HPC) resource group, Electronic Design Automation (EDA) Platform as a Service (PaaS), cloud infrastructure, metric collector, streams, stream service management, data lake, metadata catalogue, views and Continuous Learning Hub (CLH);
extract data related to the one or more EDA jobs, the HPC resource group, the EDA PaaS, and the cloud infrastructure by the exporters, wherein the extracted data captures the capabilities of the HPC resource group of the one or more EDA jobs;
receive data related to (i) the one or more EDA jobs, (ii) historic execution of the one or more EDA jobs and (iii) the cloud infrastructure, wherein the received data comprises Random Access Memory (RAM) allocated to the one or more EDA jobs, hard disk allocated to the one or more EDA jobs, average RAM utilization, peak RAM utilization, disk utilization, and number of reruns of the one or more EDA jobs;
transfer the received data to stream services management for preprocessing a plurality of metrics extracted from the received data, wherein the plurality of metrics are stored in the data lake;
train a first Machine Learning (ML) model and a second ML model using metadata generated by extracting unique features and correlations in the received data stored in the data lake;
predict an optimal resource configuration required to accomplish the one or more EDA jobs based on the received data using the first Machine Learning (ML) model;
predict a partition on the cloud and a configuration circuit within the predicted partition that holds resources required by the optimal resource configuration using the second ML model, wherein the configuration circuit comprises compute, network, storage, and technology layer over which each of the one or more EDA jobs are scheduled;
evaluate cost of deploying the one or more EDA jobs over the configuration circuit on a plurality of Cloud Service Providers (CSPs) to determine a CSP among the plurality of CSPs that incurs lowest cost;
determine completion time of each of the one or more EDA jobs based on a historic completion time of the one or more EDA jobs deployed over the configuration circuit on the determined CSP;
determine time required to burst each of the one or more EDA jobs on the cloud based on (i) interconnect network performance between an on-prem infrastructure at an enterprise and the determined CSP and (ii) time required to spin up the configuration circuit on the cloud;

calculate a wait time corresponding to each of the one or more EDA jobs as a sum of completion time of the EDA job, time required to burst the EDA job on the cloud and a pre-defined desired cycle time, wherein time constraints of the one or more EDA jobs are automatically satisfied;

deploy each of the one or more EDA jobs over the configuration circuit on the determined CSP after retaining each of the one or more EDA jobs in a queue for the corresponding calculated wait time, wherein the one or more EDA jobs are deployed over the on-prem infrastructure when resources in the on-prem infrastructure are freed up before the corresponding calculated wait time;

generate reports by the views at an intermediary stage of operation of the base platform and displaying to the one or more researchers via the I/O interface(s);

observe execution of the one or more EDA jobs on the cloud and the on-prem infrastructure to calculate a plurality of parameters comprising queue throughput, server farm tilt index, queue efficiency index, configuration circuit hit rate, configuration circuit efficiency index, and landing zone efficiency, wherein the queue throughput refers to number of EDA jobs scheduled by the queue per day, wherein the server farm tilt index measures percentage utilization of a server farm, wherein the queue efficiency index is ability of the queue to keep the core utilization at peak at all times, wherein the configuration circuit hit rate measures number of times a particular configuration circuit was used by a scheduler to host the one or more EDA jobs, and wherein the configuration circuit efficiency index measures efficient utilization of the resources by the configuration circuit to run the one or more EDA jobs; and retrain the first ML model and the second ML model based on the plurality of parameters and bias in the metadata, wherein the bias in the metadata is identified by observing distribution of the received data and the bias in the metadata indicates that the metadata is different from the data used to train the first ML model and the second ML model to improve prediction of the first ML model and the second ML model.

4. The system of claim 3, wherein the received data comprises type and technology of the one or more EDA jobs, number of gates in design of the one or more EDA jobs, hardware processors allocated to the one or more EDA jobs, number of nodes in each of the hardware processors, number of Non-Uniform Memory Access (NUMA) regions on node, NUMA affinity, hyper threading status, running frequency of the hardware processors, maximum frequency of the hardware processors, L2/L3 Cache, configuration of the hardware processors, disk I/O, number of parallel threads of the one or more EDA jobs, NUMA latency, run time of the one or more EDA jobs, average percentage utilization per core of the hardware processors, peak percentage utilization per core, average wait time of EDA jobs in the queue (in hours), average number of EDA jobs in queue per day, node up time, geo presence index of the cloud infrastructure, EDA job diversity factor, hardware refresh cycle of the cloud infrastructure, protected license investments of the cloud infrastructure, security Key Performance Indicators (KPIs) of the cloud infrastructure, software lock-in index of EDA tool, design experience level, cloud infrastructure uptime, throughput of the one or more EDA jobs, flow rate of the one or more EDA jobs, and rate of consumption of EDA tool licenses.

5. One or more non-transitory machine-readable information storage mediums comprising one or more instructions which when executed by one or more hardware processors cause:

submitting one or more EDA jobs to a base platform by one or more researchers via I/O interface(s), wherein the base platform is implemented on premises of an enterprise or on cloud as per requirements of the enterprise and wherein a plurality of components of the base platform are executed, via the one or more hardware processors and wherein the plurality of components of the base platform comprises the one or more EDA Jobs, exporters, High Performance Computing (HPC) resource group, Electronic Design Automation (EDA) Platform as a Service (PaaS), cloud infrastructure, metric collector, streams, stream service management, data lake, metadata catalogue, views and Continuous Learning Hub (CLH);

extracting data related to the one or more EDA jobs, the HPC resource group, the EDA PaaS, and the cloud infrastructure by the exporters, wherein the extracted data captures the capabilities of the HPC resource group of the one or more EDA jobs;

receiving data related to (i) the one or more EDA jobs, (ii) historic execution of the one or more EDA jobs and (iii) the cloud infrastructure, wherein the received data comprises Random Access Memory (RAM) allocated to the one or more EDA jobs, hard disk allocated to the one or more EDA jobs, average RAM utilization, peak RAM utilization, disk utilization, and number of reruns of the one or more EDA jobs;

transferring the received data to stream services management for preprocessing a plurality of metrics extracted from the received data, wherein the plurality of metrics are stored in the data lake;

training a first Machine Learning (ML) model and a second ML model using metadata generated by extracting unique features and correlations in the received data stored in the data lake;

predicting an optimal resource configuration required to accomplish the one or more EDA jobs based on the received data using the first Machine Learning (ML) model;

predicting a partition on the cloud and a configuration circuit within the predicted partition that holds resources required by the optimal resource configuration using the second ML model, wherein the configuration circuit comprises compute, network, storage, and technology layer over which each of the one or more EDA jobs are scheduled;

evaluating cost of deploying the one or more EDA jobs over the configuration circuit on a plurality of Cloud Service Providers (CSPs) to determine a CSP among the plurality of CSPs that incurs lowest cost;

determining completion time of each of the one or more EDA jobs based on a historic completion time of the one or more EDA jobs deployed over the configuration circuit on the determined CSP;

determining time required to burst each of the one or more EDA jobs on the cloud based on (i) interconnect network performance between an on-prem infrastructure at an enterprise and the determined CSP and (ii) time required to spin up the configuration circuit on the cloud;

calculating a wait time corresponding to each of the one or more EDA jobs as a sum of completion time of the EDA job, time required to burst the EDA job on the cloud and a pre-defined desired cycle time, wherein time constraints of the one or more EDA jobs are automatically satisfied;

deploying each of the one or more EDA jobs over the configuration circuit on the determined CSP after retaining each of the one or more EDA jobs in a queue for the corresponding calculated wait time, wherein the one or more EDA jobs are deployed over the on-prem infrastructure when resources in the on-prem infrastructure are freed up before the corresponding calculated wait time;

generating reports by the views at an intermediary stage of operation of the base platform and displaying to the one or more researchers via the I/O interface(s);

observing execution of the one or more EDA jobs on the cloud and the on-prem infrastructure to calculate a plurality of parameters comprising queue throughput, server farm tilt index, queue efficiency index, configuration circuit hit rate, configuration circuit efficiency index, and landing zone efficiency, wherein the queue throughput refers to number of EDA jobs scheduled by the queue per day, wherein the server farm tilt index measures percentage utilization of a server farm, wherein the queue efficiency index is ability of the queue to keep the core utilization at peak at all times, wherein the configuration circuit hit rate measures number of times a particular configuration circuit was used by a scheduler to host the one or more EDA jobs, and wherein the configuration circuit efficiency measures efficient utilization of the resources by the configuration circuit to run the one or more EDA jobs; and retraining the first ML model and the second ML model based on the plurality of parameters and bias in the metadata, wherein the bias in the metadata is identified by observing distribution of the received data and the bias in the metadata indicates that the metadata is different from the data used to train the first ML model and the second ML model to improve prediction of the first ML model and the second ML model.

6. The one or more non-transitory machine-readable information storage mediums of claim 5, wherein the received data comprises type and technology of the one or more EDA jobs, number of gates in design of the one or more EDA jobs, hardware processors allocated to the one or more EDA jobs, number of nodes in each of the hardware processors, number of Non-Uniform Memory Access (NUMA) regions on node, NUMA affinity, hyper threading status, running frequency of the hardware processors, maximum frequency of the hardware processors, L2/L3 Cache, configuration of the hardware processors, disk I/O, number of parallel threads of the one or more EDA jobs, NUMA latency, run time of the one or more EDA jobs, average percentage utilization per core of the hardware processors, peak percentage utilization per core, average wait time of EDA jobs in the queue (in hours), average number of EDA jobs in queue per day, node up time, geo presence index of the cloud infrastructure, EDA job diversity factor, hardware refresh cycle of the cloud infrastructure, protected license investments of the cloud infrastructure, security Key Performance Indicators (KPIs) of the cloud infrastructure, software lock-in index of EDA tool, design experience level, cloud infrastructure uptime, throughput of the one or more EDA jobs, flow rate of the one or more EDA jobs, and rate of consumption of EDA tool licenses.

* * * * *